(12) United States Patent
Corral Blanco et al.

(10) Patent No.: US 6,229,717 B1
(45) Date of Patent: May 8, 2001

(54) SWITCHED POWER SUPPLY CONVERTER OPERABLE IN A NATURAL ZERO-VOLTAGE SWITCHING MODE

(75) Inventors: Juan Antonio Corral Blanco; Lourdes Alvarez Barcia, both of Madrid; Miguel Rascon Martinez, Jaen, all of (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/550,296

(22) Filed: Apr. 14, 2000

(30) Foreign Application Priority Data

May 6, 1999 (ES) .................................................... 9900936

(51) Int. Cl.⁷ .................................................. H02M 3/335
(52) U.S. Cl. ................................. 363/21.14; 363/21.16; 363/21.02; 363/21.03; 363/89; 363/127
(58) Field of Search .................................. 363/89, 21.14, 363/21.16, 127, 21.02, 21.03

(56) References Cited

U.S. PATENT DOCUMENTS

| | | | | |
|---|---|---|---|---|
| 4,809,148 | * | 2/1989 | Barn | 363/20 |
| 5,434,768 | * | 7/1995 | Jitaru et al. | 363/21 |
| 5,594,629 | | 1/1997 | Steigerwald | 363/21 |
| 5,781,420 | | 7/1998 | Xia et al. | |
| 5,973,939 | * | 10/1999 | Tan | 363/21 |
| 5,986,899 | * | 11/1999 | Xia et al. | 363/20 |
| 6,002,597 | * | 12/1999 | Rozman | 363/89 |
| 6,061,253 | * | 5/2000 | Igarashi et al. | 363/19 |

* cited by examiner

*Primary Examiner*—Shawn Riley
(74) *Attorney, Agent, or Firm*—Sughrue, Mion, Zinn, Macpeak & Seas, PLLC

(57) ABSTRACT

A zero voltage switched power supply converter includes a series combination of a first winding and a first switching element. A second winding is connected to a second switching element and to a storage capacitor, and a series combination of a second storage capacitor and a third switching element is connected in parallel with said second switching element, so that when the second switching element becomes non-conducting, the third switching element continues in the conduction state, starting a first resonance period that concludes when the third switching element becomes non-conducting and starts a second free resonance period, and the switching is achieved at zero voltage.

9 Claims, 2 Drawing Sheets

SWITCHED POWER SUPPLY CONVERTER OPERABLE IN A NATURAL ZERO-VOLTAGE SWITCHING MODE

OBJECT OF THE INVENTION

The present invention relates to a switched power supply converter that comprises a switching element on the primary side, which serves for supervising the transfer of energy between the input and the output of the converter. The switching action of the switching element is done at zero voltage through the control of the duty cycle of an auxiliary switching element.

The switched power supply converter is of special, but not exclusive, application in distributed power supply systems in which there is a requirement for switched power supply converters with low power and voltage, that are mounted on printed circuit boards as one more electronic component thereof and, consequently, high density integration and reduced size are necessary.

STATE OF THE ART

A zero voltage switched power supply converter has been described in the U.S. Pat. No. 5,594,629 by R. L. Steigerwald, incorporated in the present patent application by reference.

The switched converter comprises a transformer in which one end of a primary winding is connected to a first terminal of the first switching element, a second terminal of the first switching element is connected to one end of a direct current power source and its other end is connected to the other end of the primary winding, a storage capacitor is connected in parallel with the previously described series combination, making up the primary side of the converter.

Likewise, a secondary winding is connected in series with a second switching element for maintaining a constant output voltage, forming the secondary side of the converter.

A switching signal is applied to the control terminal of the first switching element for controlling its switching action (non-conducting or conducting), so that its switching action takes place at zero voltage. That is, when the second switching element stops conduction and the first switching element is still in a non-conducting state, the resonance circuit formed by a parasitic capacitance of the first switching element and a magnetising inductance of the transformer reduces to zero the voltage across the first and second terminal of the first switching element.

The period for the resonance circuit to bring to zero the voltage between the first and second terminal of the first switching element is fixed.

Nevertheless, the operation mode of the aforementioned switched converter does not guarantee switching at zero voltage for a broad range of input voltages, due to the fact that both the conducting period and the non-conducting period of the first switching element is a function of the input voltage and load conditions, and as the resonance circuit is made up of passive elements it is not possible to vary the period that it requires for bringing the voltage to zero; consequently, the first switching element is switched at a voltage other than zero whereby the efficiency of the converter is impaired.

Thus, there exists a need to develop a zero voltage switched converter which accepts a broad range of input voltages and guarantees, for all of them, switching at zero voltage of the switching element of the primary side, all of the foregoing acting to boost the performance of the converter and, therefore, of the power distribution system.

CHARACTERIZATION OF THE INVENTION

To overcome the problems mentioned above, a zero voltage switched power supply converter is proposed so that the voltage in a first switching element connected in series with a primary winding of a transformer reaches the value zero before the start of a new conducting period of the first switching element.

The power supply converter is connected to a power source and comprises a transformer which has a primary winding connected in series with the first switching element, a secondary winding connected in series with a second switching element and a series combination of a storage capacitor and a third switching element connected in parallel with the second switching element.

The operation of the power supply converter is such that during any non-conducting period of the first switching element, and once the second switching element is in the conduction state, the third switching element also starts a conducting period. This conducting period continues after the second switching element turns off, that is, begins its next non-conducting period; the third switching element being turned off before the start of the next conducting period of the first switching element.

In brief, two periods of resonance are established, the first is an active resonance period which begins at the start of the non-conducting period of the second switching element and concludes at the start of the nonconducting period of the third switching element.

At the moment in which both the second switching element and the third switching element cease, respectively, to conduct, the second resonance period begins, this being a period of natural or free resonance and the duration of which is predetermined.

However, the active resonance period is variable in duration and is a function of the duty cycle of the third switching element and of the duty cycle of the first switching element, that is, of the voltage of the power source and of its load.

In this manner, it is assured that the switching of the first switching element takes place always at zero voltage, independently of the power source voltage and of the load.

BRIEF DESCRIPTION OF THE FIGURES

A more detailed explanation of the invention is to be found in the following description, based on the figures attached, in which.

PREFERRED EMBODIMENT

Figure 1:
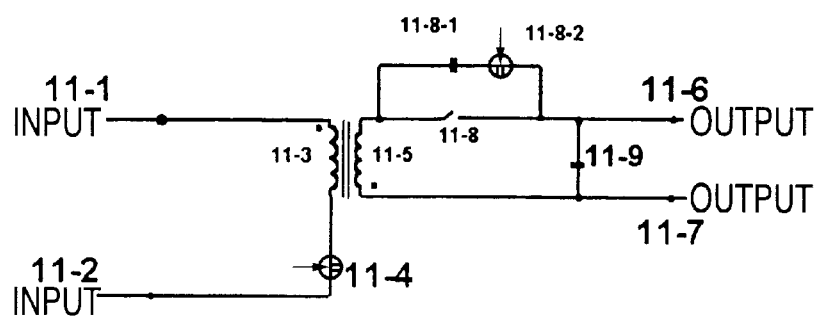
FIG. 1 shows an electrical schematic of a zero voltage switched power supply converter according to the invention.

In FIG. 1 there is shown a preferred embodiment of a zero voltage power supply converter, such as a flyback converter for example, which comprises input terminals 11-1 and 11-2, said terminals being connected to a power source.

A transformer has a first winding 11-3 so that one of its ends is connected to one of the input terminals 11-1, for example, and its other end is connected to a first terminal of a first switching element 11-4, the second terminal being connected to the other input terminal 11-2 of the power source.

The duty cycle of the first switching element 11-4 is controlled by means of a switching signal that is applied to the control terminal of the first switching element 11-4. In brief, all described above constitutes the primary side of the power supply converter.

The secondary side of the power supply converter comprises a second winding 11-5 so that one of its ends is connected to an output terminal 11-7 and its other end is connected to a first terminal of a second switching element 11-8, a second terminal thereof being connected to the other output terminal 11-6 of the power supply converter. A first storage capacitor 11-9 is connected in parallel with the previously described series combination.

The second switching element 11-8 forms the rectifying arm of a rectifier and the capacitor forms part of a filter. Both the first switching element 11-4 and the second switching element can be, respectively, a field effect transistor, MOSFET, for example. The second switching element 11-8 can also be a diode, for example.

In parallel with the second switching element 11-8 there is connected a series combination formed by a second storage capacitor 11-8-1 and a third switching element 11-8-2, so that one end of the second capacitor 11-8-1 is connected to the first terminal of the second switching element 11-8 and its other end is connected to a first terminal of the third switching element 11-8-2, a second terminal of the third switching element 11-8-2 being connected to the second terminal of the second switching element 11-8.

Figure 2:
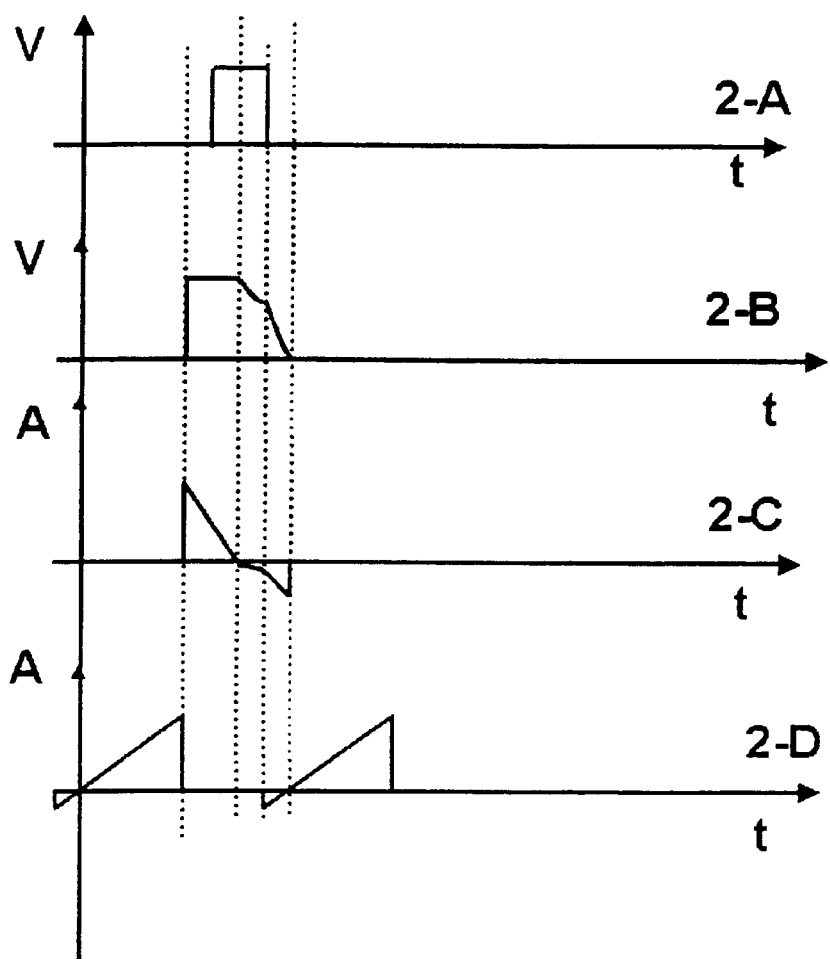
FIG. 2 shows graphically the voltage and current waveforms in the zero voltage switched power supply converter according to the invention.

The operation of the power supply converter is explained with respect to FIG. 2. When the first switching element 11-4 is in a conduction state, the input terminals 11-1 and 11-2 are disconnected from the output terminals 11-6 and 11-7, and energy is stored in the first winding 11-3 of the transformer during this period of time. Graph 2-D represents the current that flows through the first winding 11-3. In addition, consequently, the first capacitor 11-9 delivers the current required by the load via the output terminals 11-6 and 11-7.

On conclusion of the aforementioned conducting period of the first switching element 11-4, a conducting period of the second switching element 11-8 starts that concludes when the current in the second winding 11-5 passes through zero (before the start of the next conducting period of the first switching element 11-4), whereby the current in the first winding 11-3 continues in the same direction, and the energy stored in the previous period is transferred to the second winding 11-5 of the transformer and, as a result, to the output terminals 11-6 and 11-7. The graph 2-B represents the voltage across the first and second terminal of the first switching element 11-4 and the graph 2-C represents the current flowing through the second winding 11-5 during the non-conducting period of the first switching element 11-4.

At the same time, the first capacitor 11-9 is recharged in order that in the next conducting period of the first switching element 11-4, it can deliver all the current demanded by the load.

Before the conclusion of the conducting period of the second switching element 11-8, a conducting period of the third switching element 11-8-2 starts, its duty cycle being a function of the duty cycle of the first switching element 11-4, which, in turn, is a function of the voltage of the power source and of the load of the power supply converter. The third switching element 11-8-2 can also be a MOSFET.

A second control signal, synchronised with the first control signal, is applied to the control terminal of the third switching element 11-8-2 for controlling its duty cycle, shown in graph 2-A of FIG. 2. The first control signal is generated by a first controller means synchronised with a second controller means which generates the second control signal. Each controller means can be a pulse width modulator (PWM), for example, not shown in FIG. 1.

The moment of starting the next non-conducting period of the second switching element 11-8 defines the start of a first active resonance period that concludes with the start of the next non-conducting period of the third switching element 11-8-2, consequently, this period is variable and is determined by the duty cycle of the third switching element 11-8-2.

Thus, a resonance circuit is formed by a parasitic capacitance established between the first and second terminal of the first switching element 11-4, a magnetising inductance of the transformer and the third capacitor 11-8-1.

The start of the next non-conducting period of the third switching element 11-8-2, defines the start of a second free or natural resonance period the duration of which is predetermined and fixed, which finalises with the start of the next conducting period of the first switching element 11-4. A resonance circuit is formed by the parasitic capacitance of the first switching element 11-4 and the magnetising inductance of the transformer.

During the active resonance the voltage across the first and second terminal of the first switching element 11-4 tends to zero slowly and its duration is variable, and during the natural resonance the same voltage tends rapidly to zero and its duration is fixed.

In brief, during the active resonance only the third switching element 11-8-2 conducts, and during the free resonance no switching element conducts, so that when a new conducting period of the first switching element 11-4 starts, its switching action always takes place at zero voltage.

Figure 3:
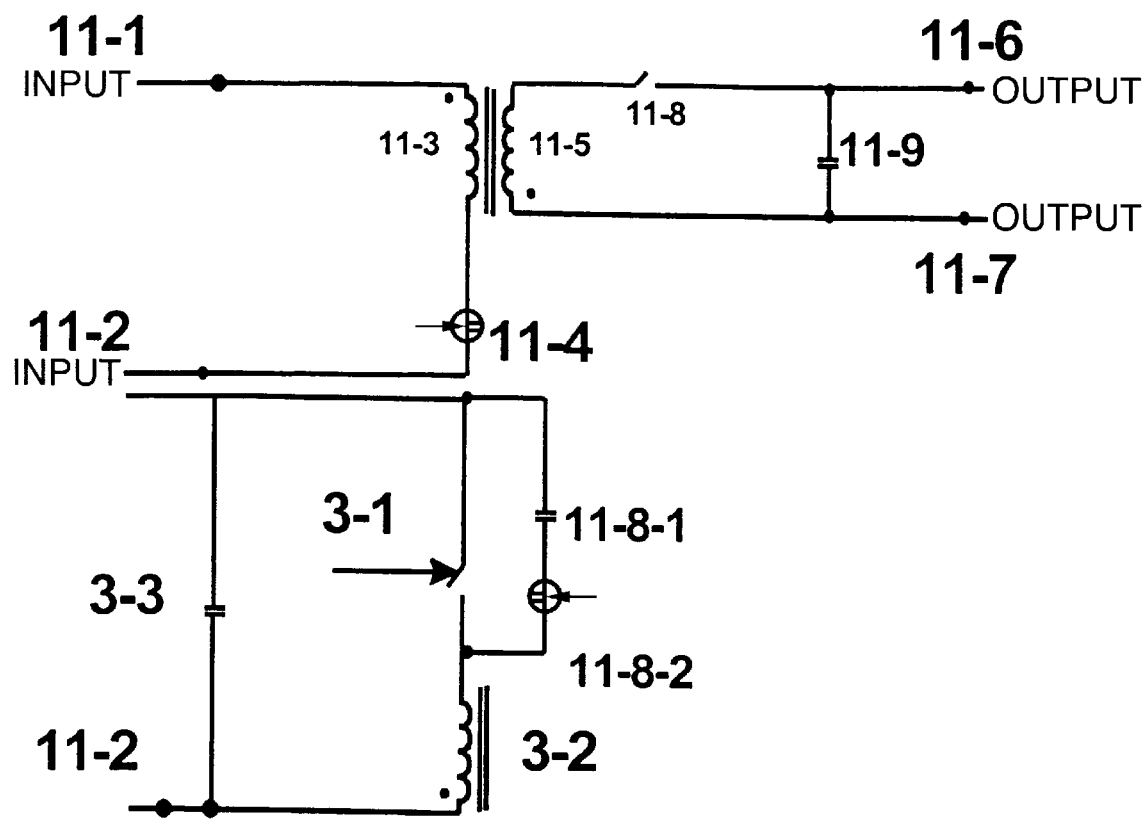
FIG. 3 shows an electrical schematic of the zero voltage switched power supply converter with an auxiliary output according to the invention.

In the other embodiment of the power supply converter, the series combination formed by the second capacitor 11-8-1 and the third switching element 11-8-2 is connected in parallel with a fourth switching element 3-1, which is connected to a third winding of the transformer 3-2. A third storage capacitor 3-3 is connected in parallel with the aforementioned series combination, so that it constitutes an auxiliary output of the power supply converter and the ground of which is referred to the ground of the primary side, shown in FIG. 3.

The operation of the power supply converter is similar to that of the first preferred embodiment. For implementing the control of the duration of the first resonance period (active resonance period) the switching action of the fourth switching element 3-1 is controlled by means of the first controller means, for example, since the auxiliary output of the power supply converter is referred to the same ground as the primary side.

In the first preferred embodiment, use has to be made of two isolated controller means, as the ground of the primary side is different to that of the secondary side.

The flyback converter has been used here as an example to provide a better description of the invention, it being possible to employ other topologies.

What is claimed is:

1. Zero voltage switched power supply converter comprising, a series combination of a first winding and a first switching element;

a second winding coupled to a rectifying arm that comprises at least one second switching element; and output terminals coupled to filtering means that comprise at least one storage capacitor, wherein a series combination of a second storage capacitor and a third switching element is coupled in parallel with said second switching element, so that when said second switching element becomes non-conducting and said third switching element continues in the conduction state a first resonance period starts that concludes when said third switching element becomes non-conducting, and said converter is a flyback converter that substantially stores energy in said primary winding.

2. Power supply converter according to claim 1, wherein the duration of said first resonance period is variable, being a function of the duty cycle of said third switching element and, consequently, of the duty cycle of said first switching element.

3. Power supply converter according to claim 1, wherein when said third switching element becomes non-conducting and said second switching element continues in a non-conduction state, and a second resonance period starts that concludes before the start of a new conducting period of said first switching element, and that said second resonance period has a predetermined duration.

4. Power supply converter according to claim 3, wherein a controller means controls the duty cycle of said third switching element and the duty cycle of said first switching element.

5. Power supply converter according to claim 1, wherein said first switching element is a field effect transistor.

6. Power supply converter according to claim 5, wherein said third switching element is a field effect transistor.

7. A zero voltage switched power supply converter comprising:
- a series combination of a first winding and a first switching element;
- a second winding coupled to a rectifying arm that comprises a second switching element;
- output terminals coupled a first storage capacitor; and
- a series combination of a third switching element and a third winding coupled in parallel with a third storage capacitor, having the same ground reference as said series combination of said first winding and said first switching element, so that said series combination of a second storage capacitor and a fourth switching element is coupled in parallel with said third switching element, wherein said first winding substantially stores energy as an inductor, and said power supply converter operates according to a flyback topology.

8. The power supply converter of claim 7, wherein when said second switching element becomes non-conducting and said fourth switching element continues in the conduction state a first resonance period starts that concludes when said fourth switching element becomes non-conducting.

9. The power supply converter of claim 7, wherein a controller controls the respective switching of said first switching element and said third switching element.

* * * * *